US006374345B1

(12) United States Patent
Juffa et al.

(10) Patent No.: US 6,374,345 B1
(45) Date of Patent: Apr. 16, 2002

(54) APPARATUS AND METHOD FOR HANDLING TINY NUMBERS USING A SUPER STICKY BIT IN A MICROPROCESSOR

(75) Inventors: Norbert Juffa, San Jose; Stuart F. Oberman, Sunnyvale, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/359,919

(22) Filed: Jul. 22, 1999

(51) Int. Cl.$^7$ .............................. G06F 7/00
(52) U.S. Cl. ...................... 712/220; 712/222
(58) Field of Search .................. 712/220, 221, 712/222, 224

(56) References Cited

U.S. PATENT DOCUMENTS

| | | | | |
|---|---|---|---|---|
| RE33,629 E | * | 7/1991 | Palmer | 708/510 |
| 5,664,136 A | * | 9/1997 | Witt | 712/208 |
| 6,044,454 A | * | 3/2000 | Schwarz | 712/201 |
| 6,122,621 A | * | 9/2000 | Goddard | 712/32 |
| 6,151,669 A | * | 11/2000 | Huck | 712/222 |
| 6,129,685 A1 | * | 4/2001 | Story | 708/498 |
| 6,216,222 B1 | * | 4/2001 | Hinds | 712/244 |
| 6,219,684 B1 | * | 4/2001 | Saxena | 708/496 |

OTHER PUBLICATIONS

US patent application serial No. 09/265,230.*
US patent application No. 09/329,497.*
US patent application No. 09/329,718.*

* cited by examiner

*Primary Examiner*—Eric Coleman
(74) *Attorney, Agent, or Firm*—Conley, Rose & Tayon, PC; B. Noël Kivlin

(57) ABSTRACT

An apparatus and method for handling tiny numbers using a super sticky bit are provided. In response to detecting that a preliminary result of an instruction corresponds to a tiny number and an underflow exception is masked, an execution pipeline can be configured to store a value corresponding to the preliminary result and a super sticky bit in a destination register. Also, a destination register tag corresponding to the destination register and a denormal exception indicator corresponding to the tiny number and masked underflow exception can be stored. A trap handler can be initiated to generate a corrected result for the instruction. The trap handler can detect that the denormal exception indicator has been set and can read the value and the super sticky bit from the destination register using the destination register tag. The trap handler can generate a corrected result for the instruction based on the value and the super sticky bit. An instruction subsequent to the trapping instruction can then be restarted.

22 Claims, 11 Drawing Sheets

| Value | Sign | Exponent | Significand |
|---|---|---|---|
| Zero | x | $00\ldots00_2$ | $0.00\ldots00_2$ |
| Infinity | x | $11\ldots11_2$ | $1.00\ldots00_2$ |
| QNaN | x | $11\ldots11_2$ | $1.1xx\ldots xx_2$ |
| SNaN | x | $11\ldots11_2$ | $1.0xx\ldots xx_2$ |
| Denormal | x | $00\ldots00_2$ | $0.xx\ldots xx_2$ |

APPARATUS AND METHOD FOR HANDLING TINY NUMBERS USING A SUPER STICKY BIT IN A MICROPROCESSOR

BACKGROUND OF THE INVENTION

1. Field of the Invention

This invention relates generally to the field of microprocessors and, more particularly, to execution units within microprocessors.

2. Description of the Related Art

Microprocessors are typically designed with a number of "execution units" that are each optimized to perform a particular set of functions or instructions. For example, one or more execution units within a microprocessor may be optimized to perform memory accesses, i.e., load and store operations. Other execution units may be optimized to perform general arithmetic and logic functions, e.g., shifts and compares. Many microprocessors also have specialized execution units configured to perform more complex floating-point arithmetic operations including multiplication and reciprocal operations. These specialized execution units typically comprise hardware that is optimized to perform one or more floating-point arithmetic functions.

Most microprocessors must support multiple data types. For example, x86 compatible microprocessors must execute instructions that are defined to operate upon an integer data type and instructions that are defined to operate upon floating-point data types. Floating-point data can represent numbers within a much larger range than integer data. For example, a 32-bit signed integer can represent the integers between $-2^{31}$ and $2^{31}-1$ (using two's complement format). In contrast, a 32-bit ("single precision") floating-point number as defined by the Institute of Electrical and Electronic Engineers (IEEE) Standard 754 has a range (in normalized format) from $2^{-126}$ to $2^{127} \times (2-2^{-23})$ in both positive and negative numbers.

Turning now to FIG. 1A, an exemplary format for an 8-bit integer 100 is shown. As illustrated in the figure, negative integers are represented using the two's complement format 104. To negate an integer, all bits are inverted to obtain the one's complement format 102. A constant of one is then added to the least significant bit (LSB).

Turning now to FIG. 1B, an exemplary format for a 32-bit (single precision) floating-point number is shown. A floating-point number is represented by a significant, an exponent and a sign bit. The base for the floating-point number is raised to the power of the exponent and multiplied by the significand to arrive at the number represented. In microprocessors, base 2 is typically used. The significand comprises a number of bits used to represent the most significant digits of the number. Typically, the significand comprises one bit to the left of the radix point and the remaining bits to the right of the radix point. In order to save space, the bit to the left of the radix point, known as the integer bit, is not explicitly stored. Instead, it is implied in the format of the number. Additional information regarding floating-point numbers and operations performed thereon may be obtained in IEEE Standard 754 (IEEE-754). Unlike the integer representation, two's complement format is not typically used in the floating-point representation. Instead, sign and magnitude form are used. Thus, only the sign bit is changed when converting from a positive value 106 to a negative value 108.

Numerical data formats, such as the IEEE-754, often include a number of special and exceptional cases. These special and exceptional cases may appear in one or more operands or one or more results for a particular instruction. FIG. 2 illustrates the sign, exponent, and significand formats of special and exceptional cases that are included in the IEEE-754 floating-point standard. The special and exceptional cases shown in FIG. 2 include a zero value, an infinity value, NaN (not-a-number) values, and a denormal value. An 'x' in FIG. 2 represents a value that can be either one or zero. NaN values may include a QNaN (quiet not-a-number) value and a SNaN (signaling not-a-number) value as defined by a particular architecture. The numbers depicted in FIG. 2 are shown in base 2 format as indicated by the subscript 2 following each number. As shown, a number with all zeros in its exponent and significand represents a zero value in the IEEE-754 floating-point standard. A number with all ones in its exponent, a one in the most significant bit of its significand, and zeros in the remaining bits of its significand represents an infinity value. The remaining special and exceptional cases are depicted similarly.

Floating-point execution units will occasionally generate results that are smaller in magnitude than the smallest normalized number representable in a given floating-point precision, i.e. the exponent of the result is less than the minimum exponent for normalized numbers in that precision. These results are often referred to as "tiny" results. A tiny result may eventually yield a final result of either zero, a denormal, or the smallest normalized number in that precision. Despite the fact that tiny results occur rarely in many floating-point execution units, a floating-point execution unit must spend additional processing time and/or include additional hardware to correctly handle the tiny result and produce the desired final result. Thus, a system and method to handle tiny numbers without increasing microprocessor hardware are desired.

SUMMARY

The problems outlined above are in large part solved by an apparatus and method in described herein. Generally speaking, an apparatus and method for handling tiny numbers using a super sticky bit are provided. In response to detecting that a preliminary result of an instruction corresponds to a tiny number and an underflow exception is masked, an execution pipeline can be configured to store a value corresponding to the preliminary result and a super sticky bit in a destination register. Also, a destination register tag corresponding to the destination register and a denormal exception indicator corresponding to the tiny number and masked underflow exception can be stored. A trap handler can be initiated to generate a corrected result for the instruction. The trap handler can detect that the denormal exception indicator has been set and can read the value and the super sticky bit from the destination register using the destination register tag. The trap handler can generate a corrected result for the instruction based on the value and the super sticky bit. An instruction subsequent to the trapping instruction can then be restarted.

The use of the apparatus and method for handling tiny numbers using a super sticky bit may provide performance advantages over other systems. The apparatus and method may reduce the hardware needed to handle results that correspond to tiny numbers. The apparatus and method may also allow instructions to execute more efficiently by executing the more common non-tiny result cases faster while ensuring that a correct result is generated for the rare tiny result cases.

Broadly speaking, an execution unit is contemplated. In one embodiment, the execution unit includes an execution pipeline, a retire queue coupled to said execution pipeline, and a trap handler. The execution pipeline is configured to generate a super sticky bit corresponding to an instruction in response to a preliminary result of said instruction corresponding to a tiny number and in response to an underflow exception mask being set. The execution pipeline is configured to store a value corresponding to the preliminary result and the super sticky bit in a destination register. The retire queue is configured to store a denormal exception indicator corresponding to the instruction and a destination register tag corresponding to said destination register. The trap handler is configured to generate a corrected result using the value and the super sticky bit in response to the denormal exception indicator being set. The trap handler is configured to store the corrected result in the destination register using the destination register tag.

A method is also contemplated. The method includes determining that a preliminary result of an instruction corresponds to a tiny number, determining that an underflow exception is masked, and generating a super sticky bit. The method also includes writing a value corresponding to the preliminary result to a destination register, writing the super sticky bit to the destination register, and setting a denormal exception indicator corresponding to the instruction. The method further includes initiating a trap handler, generating a corrected result using the value and the super sticky bit, and writing the corrected result to the destination register In addition, a microprocessor is contemplated. In one embodiment, the microprocessor includes an execution unit and a reorder buffer coupled to the execution unit. The execution unit includes an execution pipeline, a retire queue coupled to said execution pipeline, and a trap handler. The execution pipeline is configured to generate a super sticky bit corresponding an instruction in response to a preliminary result of said instruction corresponding to a tiny number and in response to an underflow exception mask being set. The execution pipeline is configured to store a value corresponding to the preliminary result and the super sticky bit in a destination register. The retire queue is configured to store a denormal exception indicator corresponding to the instruction and a destination register tag corresponding to said destination register. The trap handler is configured to generate a corrected result using the value and the super sticky bit in response to the denormal exception indicator being set. The trap handler is configured to store the corrected result in the destination register using the destination register tag. The reorder buffer is configured to convey an abort signal corresponding to the instruction to the retire queue. In some embodiments, the microprocessor may be configured to retire the instruction that produces the tiny result, but abort subsequent instructions in order to start a trap handler.

In addition, a computer system comprising a microprocessor and an input/output device is contemplated. The microprocessor includes an execution unit and a reorder buffer coupled to the execution unit. The execution unit includes an execution pipeline, a retire queue coupled to said execution pipeline, and a trap handler. The execution pipeline is configured to generate a super sticky bit corresponding an instruction in response to a preliminary result of said instruction corresponding to a tiny number and in response to an underflow exception mask being set. The execution pipeline is configured to store a value corresponding to the preliminary result and the super sticky bit in a destination register. The retire queue is configured to store a denormal exception indicator corresponding to the instruction and a destination register tag corresponding to said destination register. The trap handler is configured to generate a corrected result using the value and the super sticky bit in response to the denormal exception indicator being set. The trap handler is configured to store the corrected result in the destination register using the destination register tag. The reorder buffer is configured to convey an abort signal corresponding to the instruction to the retire queue. In some embodiments, the microprocessor may be configured to retire the instruction that produces the tiny result, but abort subsequent instructions in order to start a trap handler. The input/output device is configured to communicate between the microprocessor and another computer system.

BRIEF DESCRIPTION OF THE DRAWINGS

Other objects and advantages of the invention will become apparent upon reading the following detailed description and upon reference to the accompanying drawings in which:

FIG. 2 is a table listing special cases for a defined floating-point data format.

Figures 1A, 1B:
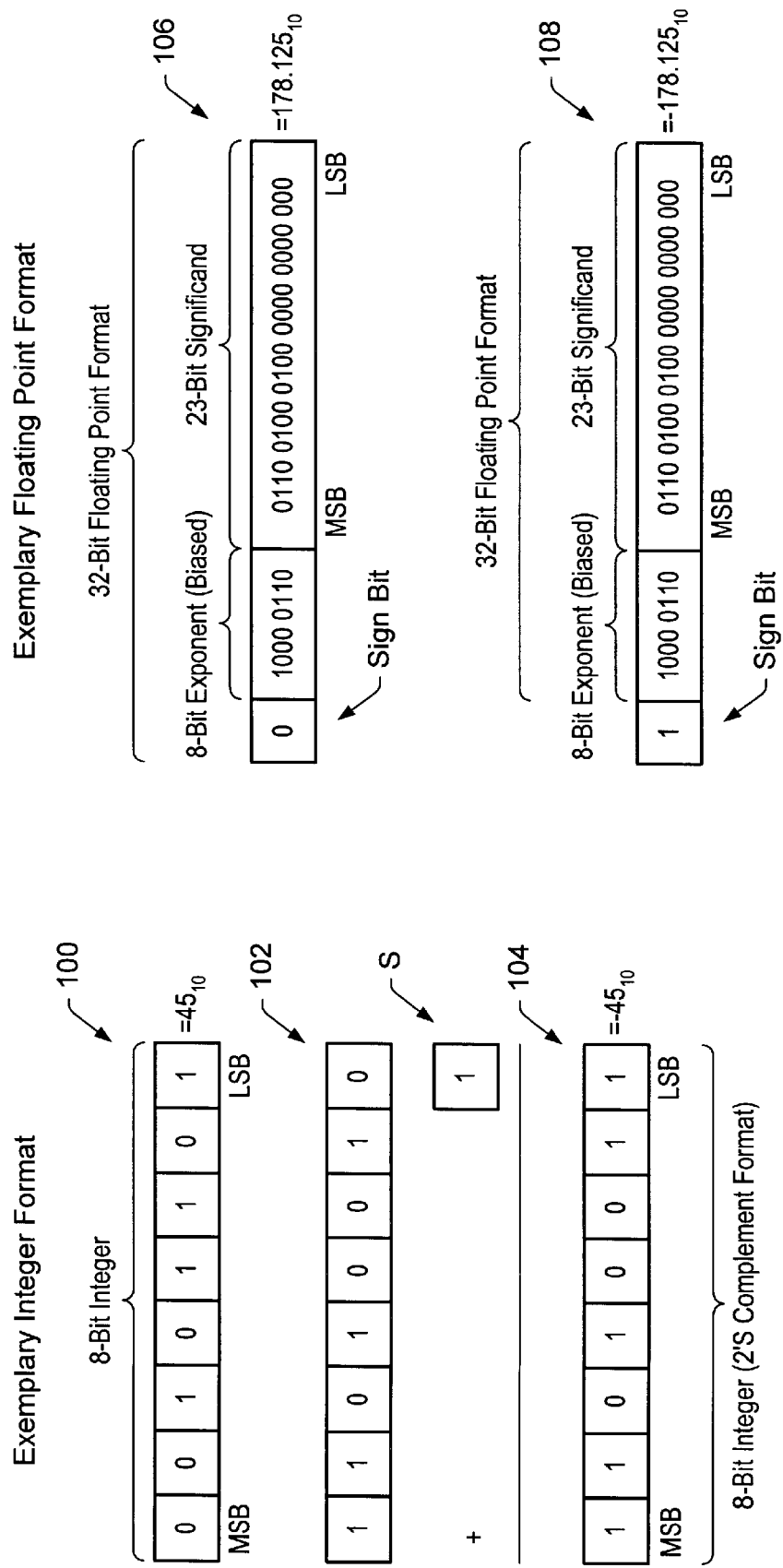
FIG. 1A is a diagram of an exemplary integer data format using two's complement representation.
FIG. 1B is a diagram of an exemplary floating-point data format.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Figure 3:
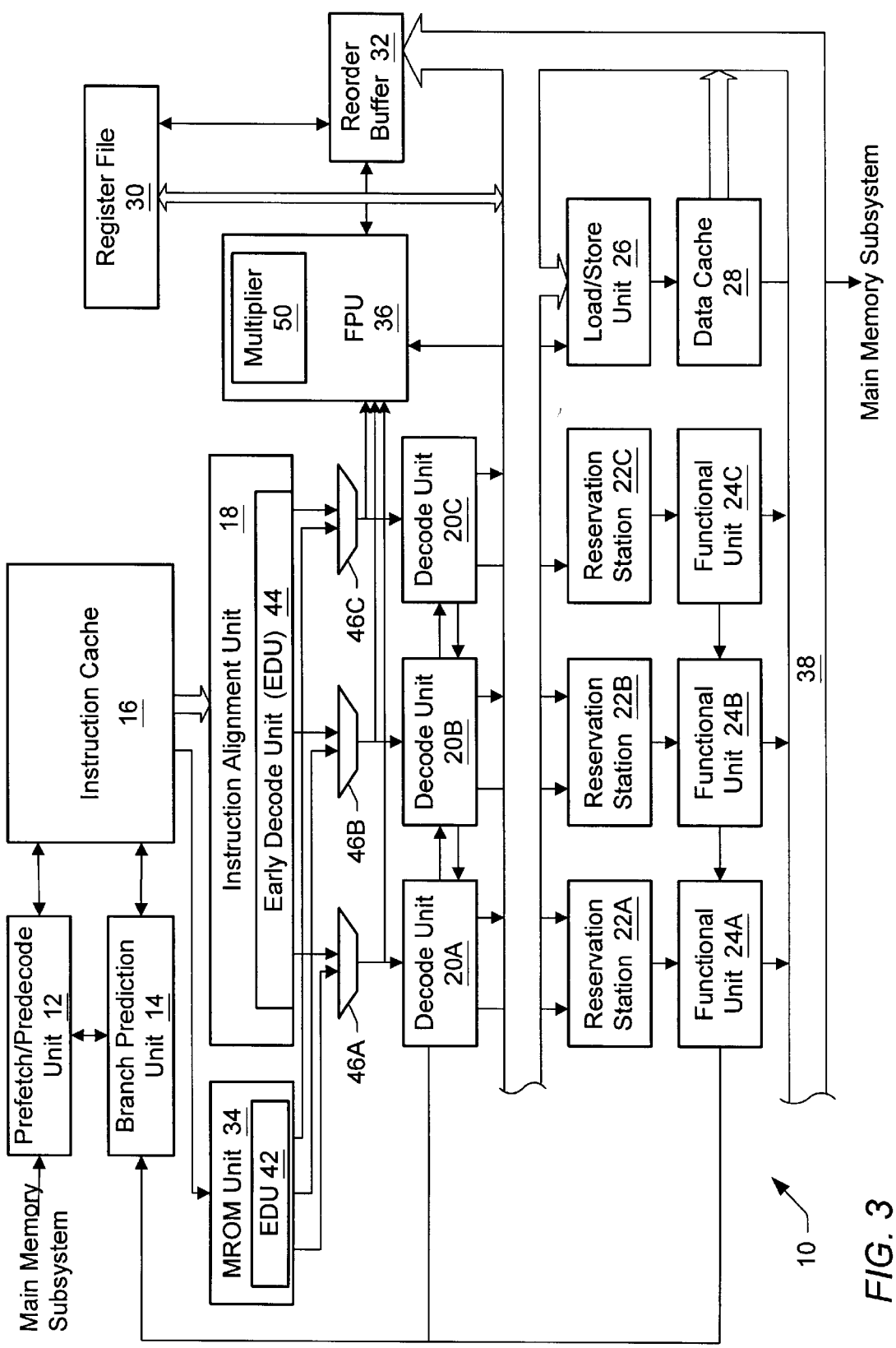
FIG. 3 is a block diagram of one embodiment of an exemplary microprocessor.

Turning now to FIG. 3, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating-point unit (FPU) 36, which in turn comprises multiplier 50. Note that elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18, which comprises an early decode unit (EDU) 44, is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34, which also comprises an early decode unit (EDU) 42 is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2-way set associative structure having 64-byte lines (a byte comprises 8 binary bits). It is noted that instruction cache 16 may be implemented in a fully-associative, set-associative, or direct-mapped configuration.

Instructions are fetched from main memory and stored into instruction cache 16 by prefetch/predecode unit 12. Instructions may be prefetched prior to the request thereof in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction may be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| Start bits | 10000 |
| End bits | 00001 |
| Functional bits | 11000 |

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18 and MROM unit 34. As instructions are fetched from instruction cache 16, the corresponding predecode data is scanned to provide information to instruction alignment unit 18 and MROM unit 34 regarding the instructions being fetched. Instruction alignment unit 18 utilizes the scanning data to align an instruction to each of multiplexers 46A–C. In one embodiment, instruction alignment unit 18 aligns instructions from three sets of eight instruction bytes to decode units 20. Similarly, MROM unit 34 is configured to output up to three aligned instructions to multiplexers 46A–C. Note, both instruction alignment unit 18 and MROM unit 34 may each have an early decode unit (EDC) 42 and 44. These units may perform the first steps of the decoding process, e.g., identifying the operand specifiers for each instruction.

Each multiplexer 46A–C is configured to receive a partially decoded instruction (and corresponding decode and predecode information) from instruction alignment unit 18 and MROM unit 34. Each multiplexer 46A–C is configured to select up to one instruction from either instruction alignment unit 18 or MROM unit 34 during each clock cycle. The selected instructions are routed to decode units 20A–C (integer instructions), and FPU 36 (x86 floating-point, MMX, and 3DX instructions). In one embodiment of microprocessor 10, up to three floating-point instructions per clock cycle may be conveyed to floating-point unit 36. As note above, the instructions may come from MROM unit 34 (microcode instructions) or instruction alignment unit 18 (fast path instructions).

Decode units 20 are configured to complete decoding instructions received from multiplexers 46A–C. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e., instructions subsequent to the particular instruction causing the exception are not retired prior to the exception). Stated another way, while some instructions following the exception-causing instruction may have been executed before the exception, their results have not been committed to the microprocessor's architectural state. It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 3, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26. In one particular embodiment, each functional unit 24 may comprise an execution unit and an independent address generation unit. Such functional units may perform an address generation for conveyance to load/store unit 26 in parallel with the execution of an integer or branch operation.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a pre-cache load/store buffer having twelve storage locations for data and address information for pending loads or stores and a post-cache load/store buffer having 32 entries. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

Data cache 28 is a high speed cache memory provided to temporarily store data being transferred between load/store unit 26 and the main memory subsystem. In one embodiment, data cache 28 has a capacity of storing up to sixty-four kilobytes of data in a two way set associative structure. It is understood that data cache 28 may be implemented in a variety of specific memory configurations, including a set associative configuration.

Figure 4:
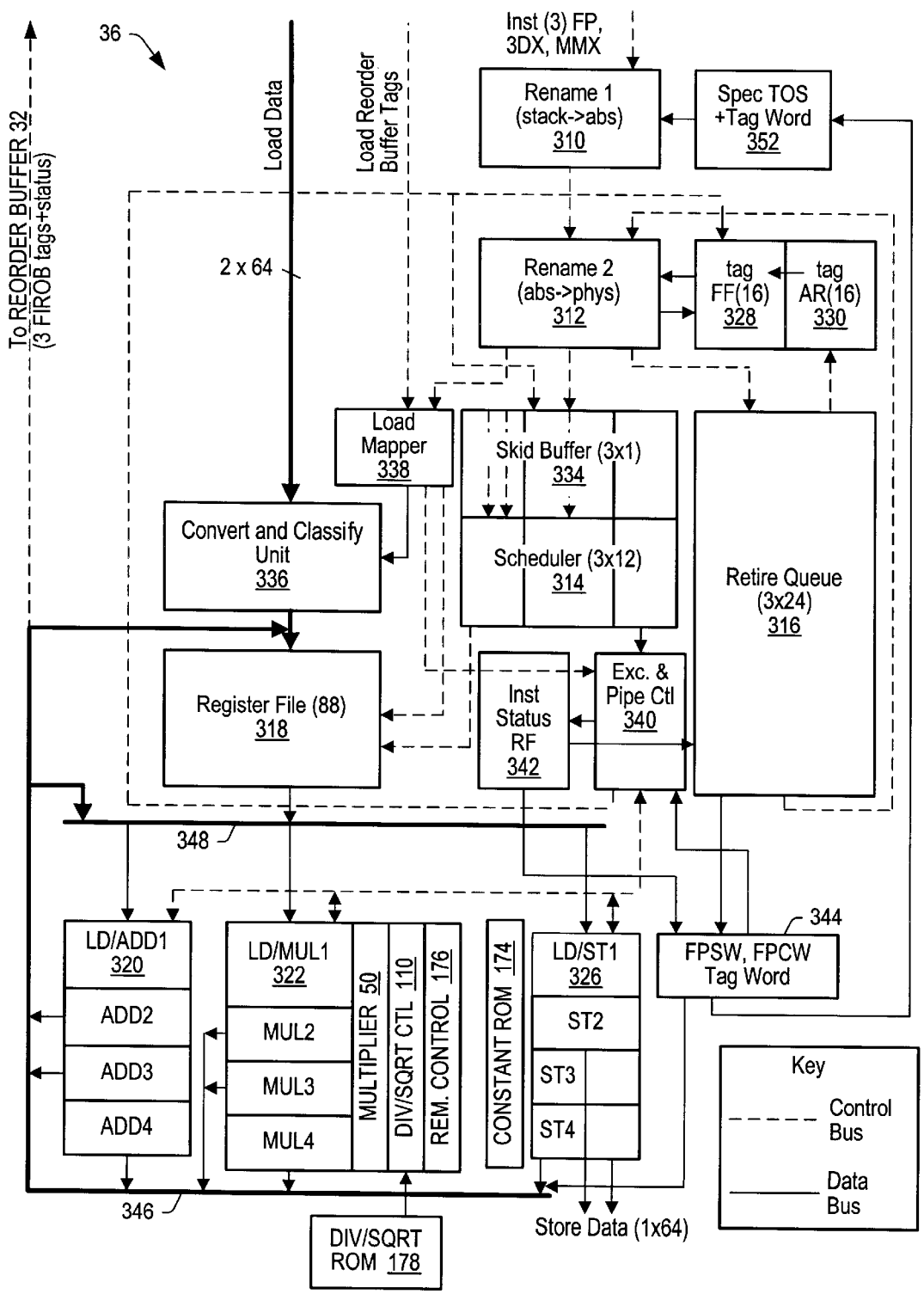
FIG. 4 is a block diagram of one embodiment of a floating-point unit from the exemplary microprocessor of FIG. 3.

Turning now to FIG. 4, details of one embodiment of FPU 36 are shown. Other embodiments are possible and contemplated. FPU 36 is a high performance out-of-order execution unit capable of accepting up to three new instructions per clock cycle. The three instructions may be any combination of x86 floating-point instructions, MMX instructions, or 3DX instructions. MMX and 3DX instructions are extensions to the standard x86 instruction set. One example of a 3DX instruction set extension is the 3DNow!™ extension from Advanced Micro Devices, Inc. MMX instructions are geared toward multimedia and two-dimensional graphic applications, while 3DX instructions are optimized for performing three-dimensional graphic manipulations such as rendering and texture mapping. Many 3DX instructions are vectored instructions that perform the same operation on a number of independent pairs of operands.

As the figure illustrates, this embodiment of FPU 36 comprises the following components: a rename-1 unit 310, a rename-2 unit 312, a scheduler 314, a retire queue 316, a register file 318, a load/add execution pipeline 320, a load/multiply execution pipeline 322, a load/store execution pipeline 326, a skid buffer 334, a convert and classify unit 336 and a load mapper 338. Rename-1 unit 310 is coupled to rename-2 unit 312 and is configured to receive a speculative top of stack (TOS) tag and tag word 352. Rename-2 unit 312 is coupled to future file tag array 328, architectural tag array 330, retire queue 316, skid buffer 334, scheduler 314, and load mapper 338. Convert and classify unit 336 is also coupled to load mapper 338, which in turn is coupled to execution and pipeline control unit 340 along with instruction status register file 342 and scheduler 314. Register file 318 receives inputs from convert and classify unit 336, load mapper 338 and scheduler 314, and outputs data to source operand bus 348. Source operand bus 348 is in turn coupled to execution pipelines 320, 322, and 326. Finally, execution pipelines 320, 322, and 326, and floating-point status/control/tag words 344 are all coupled to result bus 346. While floating-point status/control/tag words 344 and speculative top of stack and tag word 352 are shown separately in the figure for explanatory purposes, these tags may be stored together with future file tags 328 and architectural register tags 330 in a single storage location, e.g., within register file 318, execution and pipeline control unit 340, or retire queue 316.

Rename-1 unit 310 receives up to three instructions per clock cycle. As previously noted, these may be any combination of floating-point, MMX, or 3DX instructions. Rename-1 unit 310 converts stack-relative registers into absolute register numbers. For instructions with memory operands, e.g., FLD instructions (floating-point load), a stack-relative reference (e.g., the destination ST(7)) is mapped to an absolute register number. Furthermore, in some embodiments load-execute instructions such as FADD [mem] also need to source operands converted from top-of-stack relative addressing to absolute addressing. Thus, in some embodiments x87 type instructions (i.e., floating point instructions) go through the stack to absolute register translation process, while MMX and 3DNow! instructions do not.. The x86 instruction set and architecture defines eight floating-point registers that are accessed in a stack-like manner (i.e., relative to a top-of-stack pointer). Rename-1 unit 310 also assigns each instruction to one of three execution pipelines, either load/store execution pipeline 326, load/add execution pipeline 320, or load/multiply execution pipeline 322 and, if necessary, converts each instruction to an internal format.

Rename-2 unit 312 performs true register renaming. Upon receiving the instructions from rename-1 unit 310, rename-2 unit 312 reads three register tags from a "free list" of the available registers stored within retire queue 316. Once the registers have been read, rename-2 unit 312 assigns one to the destination register of each instruction. To rename the source registers, rename-2 unit 312 indexes tag future file 328 using the absolute register number for each source register. Tag future file 328 stores tags that identify which registers store the current speculative future state of each of the sixteen architectural registers in FPU 36. Similarly, architectural register tag file 330 stores tags which identify which registers within register file 318 store the current architectural (non-speculative) state of FPU 36. Note, of the sixteen registers that define FPU 36's state (architectural or speculative), eight are architectural registers (i.e., floating-point stack or MMX registers) and eight are micro-architectural registers (i.e., registers that store internal state information that is not generally accessible to the programmer). The old destination register tags are then read from the tag future file 328 and written to the tail of the free list. Finally, tag future file 328 is updated by storing tags for the new destination registers.

Memory source operands may be handled by assigning them the same register tag as the destination register. This is because load data will be converted and directly written into the destination register when it is received from load/store unit 26. In the case of an FLD instruction, no further processing is required (except in certain exceptional cases), although the FLD instruction is still assigned to an execution pipeline for the purpose of handling exceptions and signaling completion to reorder buffer 32.

Once the three instructions have passed through rename-1 unit 310 and rename-2 unit 312, the instructions are represented in a three operand format (i.e., first source operand, second source operand, and destination operand). While the first source operand is always a register operand, a bit in the opcode may be used to indicate whether the second operand is a register operand or a memory operand.

From rename-2 unit 312 the instructions are passed to scheduler 314, where the three instructions are allocated a "line" of storage. If scheduler 314 is full, the instructions may be stored in skid buffer 334 until such time as there is room within scheduler 314. After receiving the three instructions, scheduler 314 snoops result bus 346 and source operand bus 348. Scheduler 314 may also snoop load data bus. Concurrently with allocating the line of storage and snooping, retire queue 316 allocates one entry for each instruction. The entries store the destination register tags, the absolute destination register number, and the old destination register tags. Additional information may also be included, e.g., information that may be needed to update the architectural state at retire time.

On the cycle following their entry into scheduler 314, the instructions are available for scheduling. Scheduler 314 examines all of the stored instructions and issues the oldest instructions which meet the following criteria: (1) the execution pipeline to which the instruction has been assigned is available, (2) the result bus for that execution pipeline will be available on the clock cycle in which the instruction will complete (this is dependent upon the latency of the particular instruction), and (3) the instruction's source registers and or memory operands are available. In this embodiment, scheduler 314 may schedule up to three instructions per clock cycle. Each of the three execution pipelines 320, 322, and 326 may accept a new instruction every clock cycle. Note other embodiments capable of scheduling four or more instructions are also possible and contemplated.

Once all three entries in a line are scheduled, that line is free to be compacted out of scheduler 314. When the instructions are conveyed from scheduler 314 to their respective instruction execution pipeline, their source operands are read. In some cases, the source data will come from a register, while in other cases the source data will come from a "bypass". A bypass refers to the practice of result forwarding or superforwarding. Result forwarding involves conveying the results from a recently executed instruction directly to other instructions that depend upon that result. Result forwarding allows the result to be used in subsequent instructions without having to wait for the result to be stored in a register and having to read the result from the register. Result superforwarding will be described in more detail below.

Each execution pipeline 320, 322, and 326 may be configured as a four-stage pipeline. In the first stage of each pipeline, the result buses are read and the input data is taken from either the source operand bus (if the data is within register file 318) or the result bus (if a bypass is being performed). Once the source data has been received, each execution pipeline may begin performing the appropriate computation.

In the embodiment shown in the figure, execution pipeline 320 is configured to perform load and addition operations, execution pipeline 322 is configured to perform load and multiplication operations, and execution pipeline 326 is configured to perform load and store operations. Both execution pipelines 320 and 322 may be configured to perform certain MMX is instructions. Execution pipeline 322, which comprises multiplier 50, may also be configured to perform iterative calculations that involve multiplication, e.g., reciprocal operations, division operations, and square root operations, under the control of control unit 110, division/square root ROM 178, and, if a remainder is called for, remainder control unit 176. Constant ROM 174 is a read only memory configured to store a plurality of constants for load constant instructions such as FLDPI, for transcendental computation, for FPU 36 self-checking, and for certain special and exceptional results. Division/square root ROM 178 is a read only memory which stores constants used to determine initial values for division and square root computations and constants returned by certain 3DNow! instructions. Control unit 110 provides sequence information for division and square root functions. Note, in some embodiments control unit 110 may be part of execution and pipeline control unit 340.

In some cases, floating point instruction operands or floating point results generated by executing an instruction may be too small to fit within the operand or result's standard data format. These numbers are referred to as "denormals". While normalized floating-point values have a non-zero exponent and a one in the most significant bit of the significand, i.e., the bit directly to the left of the binary radix point (e.g., 1.001010 . . . ), denormals are represented with a zero exponent and a zero in the most significant bit of the significand (e.g., 0.000101 . . . ). Denormal load data is detected and tagged by convert and classify unit 336. Denormal results generated by during execution within execution pipelines 320, 322, and 326 are tagged when they are generated. Execution and pipeline control unit 340 detects the presence of the denormal tags and calls an appropriate microcode routine from MROM 34 to handle the denormal data.

At the end of the final execution stage, the data is placed on result bus 346. This makes the result data available for an instruction entering the first stage of one of the instruction execution pipelines during the next clock cycle. Once the data is on the result bus, it may also be written into register file 318. Instead of being stored in register file 318, store data is sent to the load/store unit 26. In some cases, however, store data may be sent to both the load/store unit 26 and register file 318 (e.g., for floating point load control word instructions—FLDCW—and for stores if a denormal is being stored). The reorder buffer tag and any exception information is sent back to reorder buffer 32. At this point, the instructions are complete. However, they are still speculative. When the instructions reach the bottom of reorder buffer 32 (assuming there is no branch misprediction or exception abort), reorder buffer 32 notifies FPU 36 that the instructions should be retired. The speculative state of the floating-point unit 36 is committed to the architectural state when retire queue 316 updates the tags for the architectural register file 328, and the destination register tags in retire queue 316 are written to the architectural register file 318.

Convert and classify unit 336 receives all load data, classifies it by data type, and converts it to an internal format if necessary. In one embodiment, convert and classify unit 336 appends a three bit classification tag to each data item. The three bit tag classifies the accompanying data as one of the following eight potential data types: (1) zero, (2) infinity, (3) quiet NaN, (4) signaling NaN, (5) denormal, (6) MMX, (7) normal, or (8) unsupported. NaN is a standard abbreviation for "Not-a-Number". While representations may vary across different implementations, zero data types are typically represented with a zero exponent and a zero significand. Similarly, infinity data types are typically represented with an exponent comprising all asserted ones. A quiet NaN ("QNaN") is generated whenever a floating-point instruction causes an invalid operation, e.g., a square root operation on a negative number. A signaling NaN ("SNaN"), unlike a quiet NaN, generates an exception when used. Signaling NaNs are not generated by FPU 36 and are typically only used by programmers to signal particular error conditions. The table below illustrates the characteristics of each data type for x86 compatible floating-point units (wherein "x" represents either a one or a zero):

| Sign | Exponent | Significand | Value |
|------|----------|-------------|-------|
| x | $00 \ldots 00_2$ | $0.00 \ldots 00_2$ | Zero |
| x | $11 \ldots 11_2$ | $1.00 \ldots 00_2$ | Infinity |
| x | $11 \ldots 11_2$ | $1.1xx \ldots xx_2$ | QNaN |
| x | $11 \ldots 11_2$ | $1.0xx \ldots xx_2$ | SNaN |
| x | $00 \ldots 00_2$ | $0.xx \ldots xx_2$ | Denormal |

It is noted that these data types may conform to the IEEE-754 specification.

MMX data types are 64 bits wide and comprise either eight packed 8-bit bytes, four packed 16-bit words, or two packed 32-bit double-words. MMX data types may be detected by the MMX opcodes which precede them. Normal data types are standard floating-point values that are either single precision, double precision, or extended precision (before they are translated into an internal data format) and that do not have the characteristics of any of the previously described data types. Unsupported data types are extended precision bit patterns that do not fall into any of the previously described data types and that fall outside of the normal data type as defined by IEEE Standard 754. For example, an extended precision bit sequence having a 0 sign bit, a biased exponent of 11 . . . 11, and a significand in the format (i.ff . . . ff) of 0.11 . . . 11 is an unsupported value (wherein "i" is an integer bit and wherein "f" is a fractional bit). Note, however, in other embodiments larger or smaller classification tags and additional or fewer data types may be implemented.

The data types and exemplary formats illustrated above describe the data as it is received and identified by convert and classify unit 336. Once convert and classify unit 336 classifies the data, the classification tag may be used to identify some or all of the data's properties. For example, if a value is classified as a zero, it may be identified solely by its classification tag instead of having to perform a wide comparison of each bit in the exponent and significand portions of the value. The classification tags may accompany the data throughout FPU 36 and may be stored in register file 18 along with the data.

As discussed above, when data from a load instruction is received by FPU 36, the data is routed to convert and classify unit 336. A corresponding reorder buffer tag accompanies the data and is routed to load mapper 338. As previously noted in the description of microprocessor 10, the reorder buffer tag identifies the sequence in which out of order instructions should be retired (i.e., committed to architectural state). For load instructions, the reorder buffer tag follows the data from load/store unit 26 to FPU 36. Load mapper 338 receives the reorder buffer tag and translates it into a physical register tag. The physical register tag indicates which data register within register file 318 the corresponding data is to be loaded into.

Execution and pipeline control unit 340 tracks the status of each stage in execution pipelines 320, 322, and 326. Execution and pipeline control unit 340 contains timing information enabling it to determine the future availability of each execution pipelines. For example, when an FMUL (floating-point multiply) instruction begins execution in multiplication execution pipeline 322, control unit 340 uses its stored timing information to notify scheduler 314 that the result will be available for output on result bus 346 four clock cycles later. This timing information allows scheduler 314 to efficiently schedule instruction for execution in execution pipelines 320, 322, and 326. Control unit 340 also tracks the status of each pipe stage, receiving and prioritizing exceptions from execution pipelines 320, 322, and 326.

FPU status word, control word, and tag word (collectively, words 344) are stored within retire queue 316 and indicate which of the status and control registers within register file 318 contain the FPU's current architectural state. For example, in one embodiment register file 318 may comprise 88 registers, i.e., 16 registers to store the current architectural state of FPU 36 (see below), and 72 speculative registers to store the speculative state of FPU 36. Of the 72 speculative registers, 16 store the "current" speculative state. Of each set of 16 registers that store a particular state of FPU 36 (whether the state is architectural or speculative), eight registers are FPU stack registers and eight registers are micro-architectural registers that store state information that is only accessible to microcode instructions within FPU 36, i.e., they are not accessible to the programmer and store only internal state information. In one embodiment, each register in register file 314 is 90 bits long, with 87 bits providing storage for internal format data (e.g., one sign bit, 18 exponent bits, and a 68-bit significand) and 3 class bits.

Instruction status register file 342 stores information for execution and pipeline control unit 340. As a result of instructions executing out of order in FPU 36, exceptions that occur within execution pipelines may need to be stored until the instructions generating them are the next to be retired. Retire queue 316 reads instruction status register file 342 when it retires instructions and updates the architectural floating-point status word (FPSW) and floating-point control word (FPCW) and tag word (collectively, 344) accordingly. This information is conveyed to rename-1 unit along with the current speculative top of stack 352 and on result bus 346.

Figure 5:
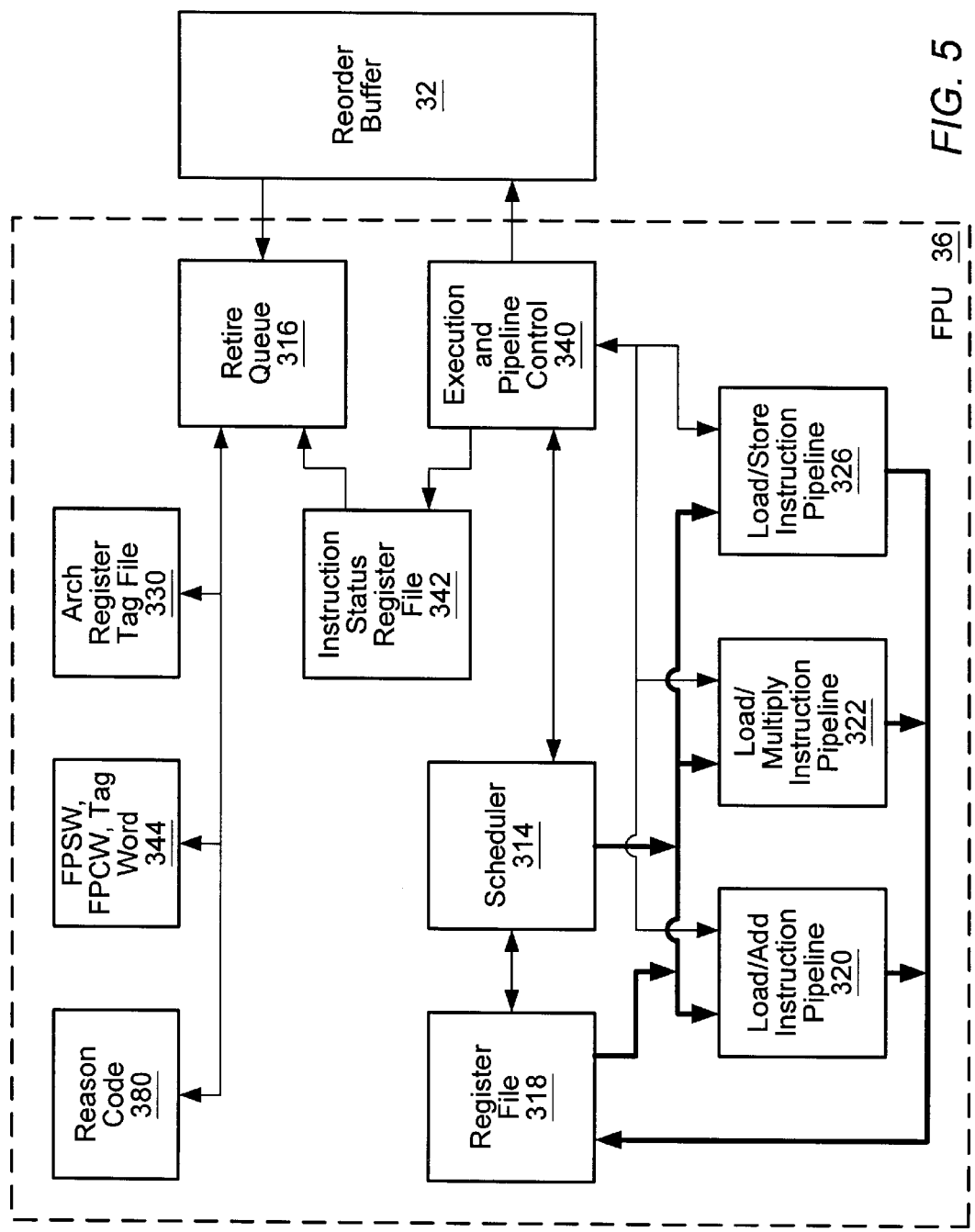
FIG. 5 is a block diagram depicting portions of one embodiment of the exemplary microprocessor of FIG. 3.

Turning now to FIG. 5, a portion of the superscalar microprocessor of FIG. 3 is shown. FIG. 5 depicts FPU 36 coupled to reorder buffer 32. FPU 36 includes register file 318, scheduler 314, load/add instruction pipeline 320, load/multiply instruction pipeline 322, load/store instruction pipeline 326, execution and pipeline control 340, instruction status register file 342, retire queue 316, architectural register tag file 330, floating-point status/control/tag words 344, and reason code register 380. Load/add instruction pipeline 320, load/multiply instruction pipeline 322, and load/store instruction pipeline 326 can be referred to collectively as the "execution pipelines" or individually as an "execution pipeline." Register file 318 is coupled to scheduler 314 and the execution pipelines. Scheduler 314 is coupled to the execution pipelines and execution and pipeline control 340. The execution pipelines are coupled to execution and pipeline control 340. Execution and pipeline control 340 is coupled to reorder buffer 32 and instruction status register file 342. Retire queue 316 is coupled to instruction status register file 342, reorder buffer 32, architectural register tag file 330, floating-point status/control/tag words 344, and reason code register 380.

FIG. 5 depicts an apparatus configured to handle tiny results of instructions using a super sticky bit. The use of the apparatus may provide performance advantages over other systems. The apparatus may reduce the hardware needed to handle results that correspond to tiny numbers. The apparatus may also allow instructions to execute more efficiently by executing the more common non-tiny result cases faster while ensuring that a correct result is generated for the rare tiny result cases.

Scheduler 314 can be configured to convey instructions to the execution pipelines for execution. Scheduler 314 can convey source register tags to register file 318 to read register source operands. Scheduler 314 can also be configured to convey information regarding those instructions to execution and pipeline control 340.

The execution pipelines can be configured to execute the instructions. In the course of executing instructions, the execution pipelines can be configured to detect that a preliminary result of an instruction corresponds to a tiny number. Generally, a tiny number can be defined as a numeric value that is less in magnitude than the smallest, normalized value representable in a given floating point format. This may occur when the exponent of a normalized value is less than the minimum exponent allowed for normalized values in the given precision. For example, the IEEE-754 standard defines the minimum unbiased exponent for a normalized single precision floating point number to be −126. Consequently, a normalized result with an exponent of −130 would be a tiny number for single precision store data. Note, however, that other floating-point standards may be used in lieu of the IEEE-754 Standard.

In response to detecting a tiny number, an execution pipeline can be configured to store a value corresponding to the preliminary result in the destination register for the instruction. In one embodiment, an execution pipeline can be configured to store different values depending on whether the underflow exception is masked. In one embodiment, if the underflow exception is masked, then the stored value can correspond to a normalized, unrounded version of the preliminary result. In this embodiment, if the underflow exception is not masked, then the stored value can correspond to a normalized, rounded version of the preliminary result. Other embodiments can be configured to store other values corresponding to the preliminary result.

If the underflow exception is masked, an execution pipeline can also be configured to generate and store a super sticky bit corresponding to the preliminary result. An execution pipeline can be configured to generate the super sticky bit using a guard bit and a sticky bit corresponding to the preliminary result as described below in FIG. 6. In order to do IEEE-754 complaint (or similar) rounding, guard bits, round bits, and sticky bits are generated. However, the round bit is only needed to properly handle cases in which the mantissa requires normalization. In the case of tiny results, the result is normalized. Thus, subsequent IEEE-754 compliant rounding may be performed with only guard bits and sticky bits. Furthermore, since the result is tiny, it is clear that the mantissa will be shifted to the right by at least one bit position before rounding, thereby creating a new guard bit at denormalization time. The current guard bit will be logically OR'ed into the sticky bit at that time. Thus, rather than transporting two bits around, the floating point unit may be configured to OR the two bits into a "super sticky" bit and sent that super sticky bit to the trap handler. The execution pipeline can be configured to store the super sticky bit in the destination register along with the value corresponding to the preliminary result.

An execution pipeline can be configured to convey a tiny number signal corresponding to an instruction to execution and pipeline control 340. In response to receiving a tiny number signal, execution and pipeline control 340 can be configured to store status data corresponding to the instruction in instruction status register file 342. The status data can indicate that a tiny number has been detected. Execution and pipeline control 340 can also be configured to convey a trap signal corresponding to the tiny number signal to reorder buffer 32 along with other information corresponding to the instruction. Reorder buffer 32 can be configured to receive the trap signal and the other information corresponding to the instruction from execution and pipeline control 340. In response to retiring the instruction, reorder buffer 32 can be configured to convey an abort signal corresponding to the trap signal to retire queue 316. Other embodiments can be configured to generate a trap or abort signal in other ways.

In response to receiving an abort signal, retire queue 316 can be configured to retire the instruction and a trap handler can be initiated to provide a corrected result for the instruction. Retire queue 316 can be configured to store information corresponding to the instruction in response to retiring the instruction. Retire queue 316 can be configured to store information in architectural register tag file 330, floating-point status/control/tag words 344, and reason code register 380. In particular, retire queue 316 can be configured to read the status data from status register file 342 and set a denormal exception indicator in reason code register 380 if the preliminary result of the instruction being retired corresponded a tiny number, the underflow exception is masked, and the instruction is not a store instruction. Retire queue 316 can also be configured to store a destination register tag corresponding to the instruction to reason code register 380. In one embodiment, the destination register tag can correspond to the absolute register number of the destination register. In other embodiments, the destination register tag can correspond to the physical register number of the destination register.

Once the instruction has been retired, a trap handler can be initiated. In one embodiment, a trap handler can include a plurality of microcode instructions. In other embodiments, a trap handler can include hardware or other software mechanisms. The trap handler can be configured to detect that the denormal exception indicator in reason code register 380 has been set. In response, the trap handler can be configured to generate a corrected result for the instruction that caused the trap. In one embodiment, the corrected result corresponds to a value that conforms to the IEEE-754 standard. In other embodiments, the corrected result can correspond to other values.

The trap handler can be configured to read the value and the super sticky bit from the destination register of the instruction using the destination register tag stored in reason code register 380. The trap handler can be configured to denormalize, round, and renormalize the value using the super sticky bit to generate the corrected result. The corrected result can then be written to the destination register and an instruction subsequent to the instruction that caused the trap can be restarted.

The trap handler can be configured to use the super sticky bit to generate a corrected result. Since the trap handler knows it is operating on a value that corresponds to a tiny number, the trap handler first denormalizes the value by shifting the mantissa of the value to the right and incrementing the exponent of the value. The mantissa can be shifted the number of bits equal to the difference between the minimum exponent and the exponent of the value. Here, 'minimum exponent' refers to the smallest exponent possible for a normalized floating-point number in a given floating-point format. As the number is tiny, the shift count is at least one, and the trap handler can be configured to use the super sticky bit as an initial sticky bit. As the value is denormalized, each bit that gets shifted out of the least significant bit of the mantissa can be shifted into a guard bit. Each respective bit shifted out of the guard bit can be OR'ed into a sticky bit. The trap handler can be configured to use the super sticky bit as the initial guard bit to generate the corrected result. As the value is denormalized, each bit that gets shifted out of the least significant bit of the mantissa can be shifted into a guard bit. Also, each respective guard bit can be logically OR'ed into a sticky bit. Once the value has been denormalized, the mantissa can be rounded using the guard bit and the sticky bit. The value can then be renormalized, i.e. the mantissa shifted to the left and the exponent decremented, until the most significant bit of the mantissa is a one to generate the corrected result. The corrected result can then be written to the destination register of the instruction and the instruction subsequent to the instruction that caused the trap can be restarted.

In one embodiment, reason code register 380 can be configured to include a precision sensitive bit. In this embodiment, retire queue 316 can be configured to set or reset the precision sensitive bit when retiring the instruction to indicate whether the instruction is sensitive to a precision control. A precision control can include one or more bits to indicate the numerical precision of the result of a corresponding instruction. Certain instructions are not sensitive to a precision control, i.e. the precision of their result does not depend on the precision control. Other instructions are sensitive to the precision control, i.e. the precision of their result depends on the precision control. In one embodiment, retire queue 316 can be configured to set the precision sensitive bit if an instruction is sensitive to a precision control. In this embodiment, retire queue 316 can be configured to reset the precision sensitive bit if an instruction is not sensitive to a precision control. Other embodiments can assign other values to a precision sensitive bit or bits.

In the embodiment of FIG. 5, the FPCW found in floating-point status/control/tag words 344 can be configured to include a two bit precision control to indicate whether a result is to be single, double or extended precision. FPU 36 can be configured to set a bit in the retire queue entry for each instruction that is sensitive to the precision control. Retire queue 316 can be configured to write this bit to the precision sensitive bit in reason code register 380 when the instruction is retired.

In one embodiment, the trap handler can be configured to read the precision sensitive bit from reason code register 380. In this embodiment, the trap handler can be configured to execute a first trap instruction to denormalize and round the value for the instruction if the precision sensitive bit is set. If the precision sensitive bit is not set, the trap handler can be configured to execute a second trap instruction to denormalize and round the value. In either case, the trap handler can be configured to execute a third trap instruction to renormalize the value.

Figure 6:
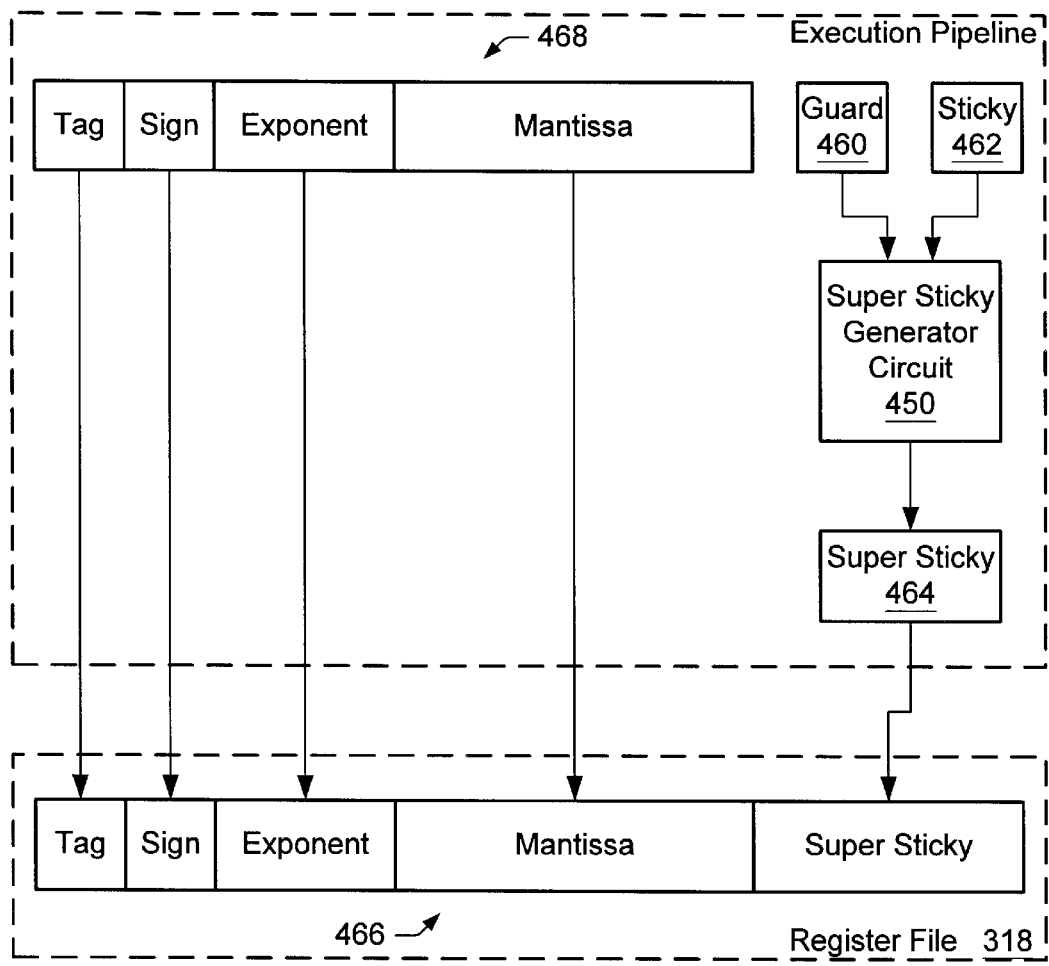
FIG. 6 is a block diagram depicting portions of one embodiment of the floating-point unit of FIG. 4.

Turning now to FIG. 6, a block diagram depicting portions of one embodiment of the floating-point unit of FIG. 4 is shown. FIG. 6 depicts an execution pipeline, such as an execution pipeline shown in FIG. 5, coupled to register file 318. The execution pipeline includes super sticky generator circuit 450 and can be configured to generate floating-point result 468 and super sticky bit 464. The floating-point result includes a tag, a sign, an exponent, and a mantissa. Register file 318 includes register 466. Register 466 includes a tag field, a sign field, an exponent field, a mantissa field, and a super sticky field. Other fields in register 466 are possible and contemplated.

The execution pipeline can be configured to generate floating-point result 468 of an instruction. Floating-point result 468 includes a tag, a sign, an exponent, and a mantissa. The tag can be configured to encode the class of FPU operands. The classes include SNAN, QNAN, infinity, normal, denormal, zero, and MMX. The classes can allow for faster detection and handling of special and exceptional operands. The sign can be configured to store a value corresponding to the sign of the result. The exponent and the mantissa can be configured to store values corresponding to the exponent and the mantissa of the result, respectively. Once floating-point result 468 has been generated by the execution pipeline, the tag, sign, exponent, and mantissa of the result can be stored in register 466.

The execution pipeline, along with generating the result, can generate guard bit 460 and sticky bit 462. In one embodiment, guard bit 460 can represent the value following the least significant bit of the mantissa. Sticky bit 462 can represent the result of a logical OR function performed on previous values of guard bit 460.

The execution pipeline can be configured to generate super sticky bit 464 in super sticky generator circuit 450 using the values of guard bit 460 and sticky bit 462. In one embodiment, super sticky generator circuit 450 can be configured to logically OR the values of guard bit 460 and sticky bit 462 to generate the value of super sticky bit 464. In other embodiments, super sticky generator circuit 450 can be configured to generate the value of super sticky bit 464 in other ways. The execution pipeline can be configured to store the value of super sticky bit 464 in register 466. In one embodiment, the execution pipeline can be configured to store the value of super sticky bit 464 in the bit following the least significant bit of the mantissa stored in register 466. Other embodiments can be configured to store the value of super sticky bit 464 in other locations. As described above in FIG. 5, a trap handler can be configured to read the result and the super sticky bit from register 466 and return a corrected result.

Figure 7:
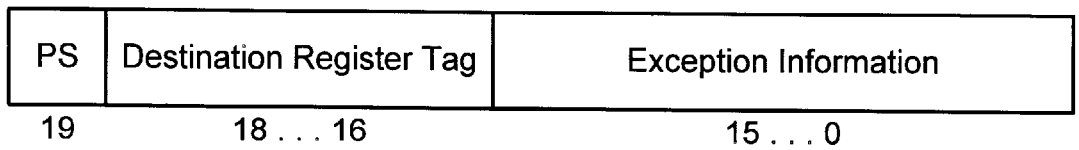
FIG. 7 is a block diagram of one embodiment of a reason code register.

Turning now to FIG. 7, a block diagram of one embodiment of a reason code register is shown. Other embodiments are possible and contemplated. FIG. 7 depicts reason code register 380. Reason code register 380 includes a precision sensitive information (PS), a destination register tag, and exception information. Other embodiments may include other types of information. In the embodiment of FIG. 7, reason code register includes 20 bits. Other embodiments may include other numbers of bits.

In the embodiment of FIG. 7, reason code register 380 includes one bit for precision sensitive information, bit 19. In one embodiment, the precision sensitive information can be set to indicate that an instruction is sensitive to a precision control. In this embodiment, the precision sensitive information can be reset to indicate that an instruction is not sensitive to a precision control. Other embodiments can set the precision sensitive information to other values.

In the embodiment of FIG. 7, reason code register 380 includes three bits for the destination register tag, bits 18 through 16. In one embodiment, the destination register tag corresponds to an absolute register number. In this embodiment, the destination register tag can refer to one of eight absolute register numbers. In other embodiments, the destination register tag can correspond to a physical register number or a register identifier.

In the embodiment of FIG. 7, reason code register 380 includes sixteen bits of exception information, bits 15 through 0. In one embodiment, each bit can be configured to indicate a particular type of exception. Other embodiments can be configured to encode the exception information. In one particular embodiment, bit 2 can be configured to indicate a denormal exception. In this embodiment, bit 2 can be set to indicate a denormal exception. In an alternative embodiment, bit 2 can be reset to indicate a denormal exception.

Figure 8:
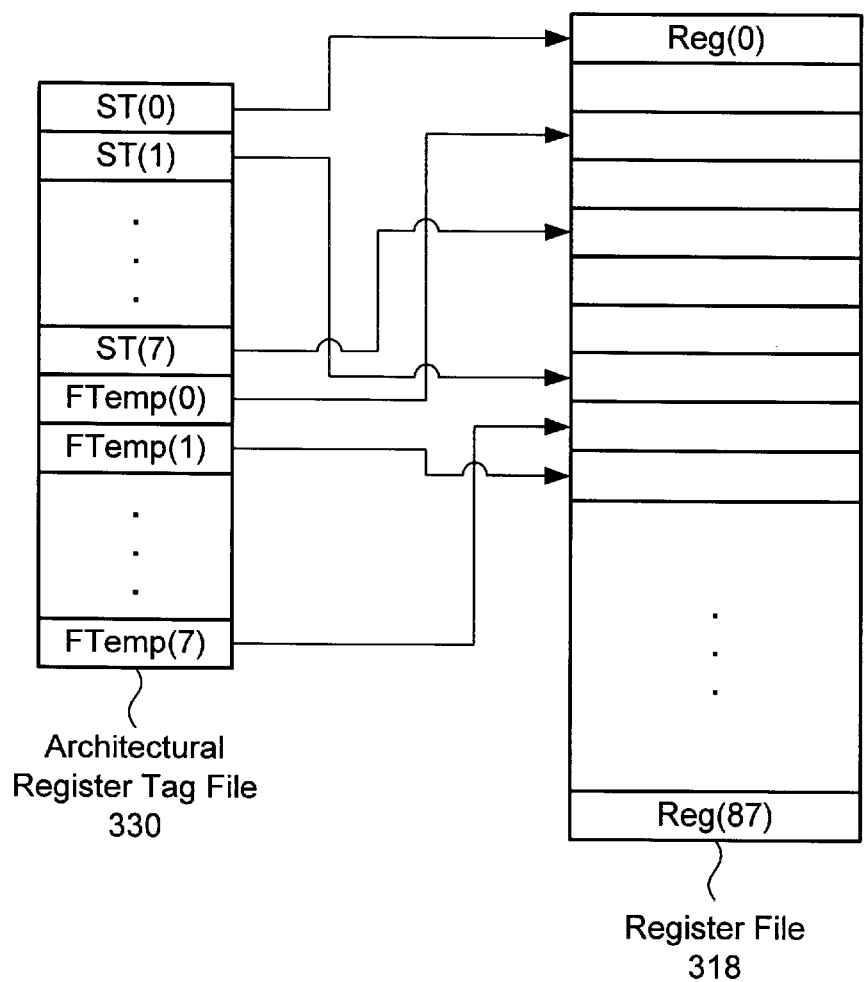
FIG. 8 is a block diagram of one embodiment register tags corresponding to registers in a register file.

Turning now to FIG. 8, a block diagram of one embodiment of register tags corresponding to registers in a register file is shown. Other embodiments are possible and contemplated. Architectural register tag file 330 and register file 318 are depicted. In the embodiment of FIG. 8, architectural register tag file 330 includes sixteen physical register tags that correspond to sixteen absolute register numbers. Register file 318 includes 88 physical registers, Reg(0) through Reg(87). The absolute register numbers include eight stack registers, ST(0) through ST(7), and eight microprocessor temporary registers, FTemp(0) through FTemp(7). In one embodiment, the microprocessor temporary registers are not accessible by the programmer and can be accessed only by microcode. Other numbers or configurations of register tags and/or registers are possible and contemplated.

In the embodiment shown in FIG. 8, architectural register tag file 330 includes sixteen, seven-bit physical register tags that each correspond to an absolute register number. The physical register tags each identify a physical register in register file 318. For example, the physical register tag corresponding to ST(0) identifies, or points to, Reg(0) as indicated by the arrow in FIG. 8. Other physical register tags identify other physical registers in register file 318 in a similar fashion. The physical register tags in architectural register tag file 330 can be accessed using architectural register identifiers. Tag future file 328, as shown in FIG. 4, may be configured in a manner similar to the embodiment of architectural register tag file 330 shown in FIG. 8.

Figure 9A:
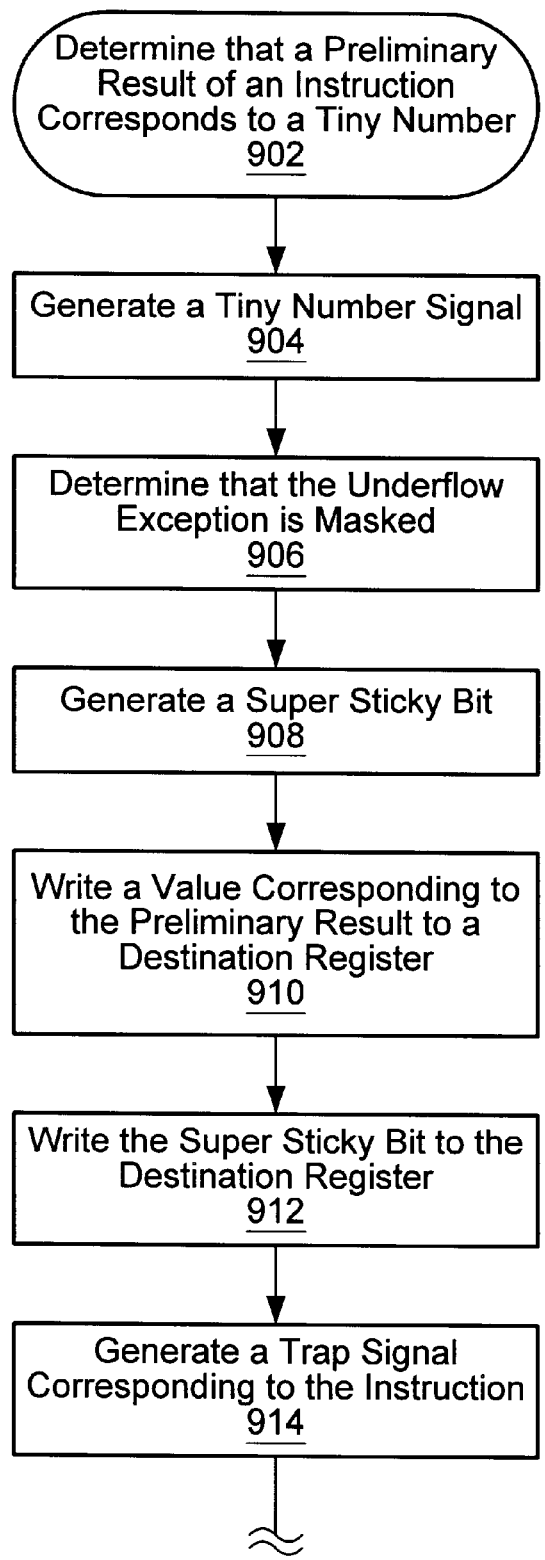
FIG. 9A is a first portion of a chart depicting a method for handling tiny numbers using a super sticky bit.
Figure 9B:
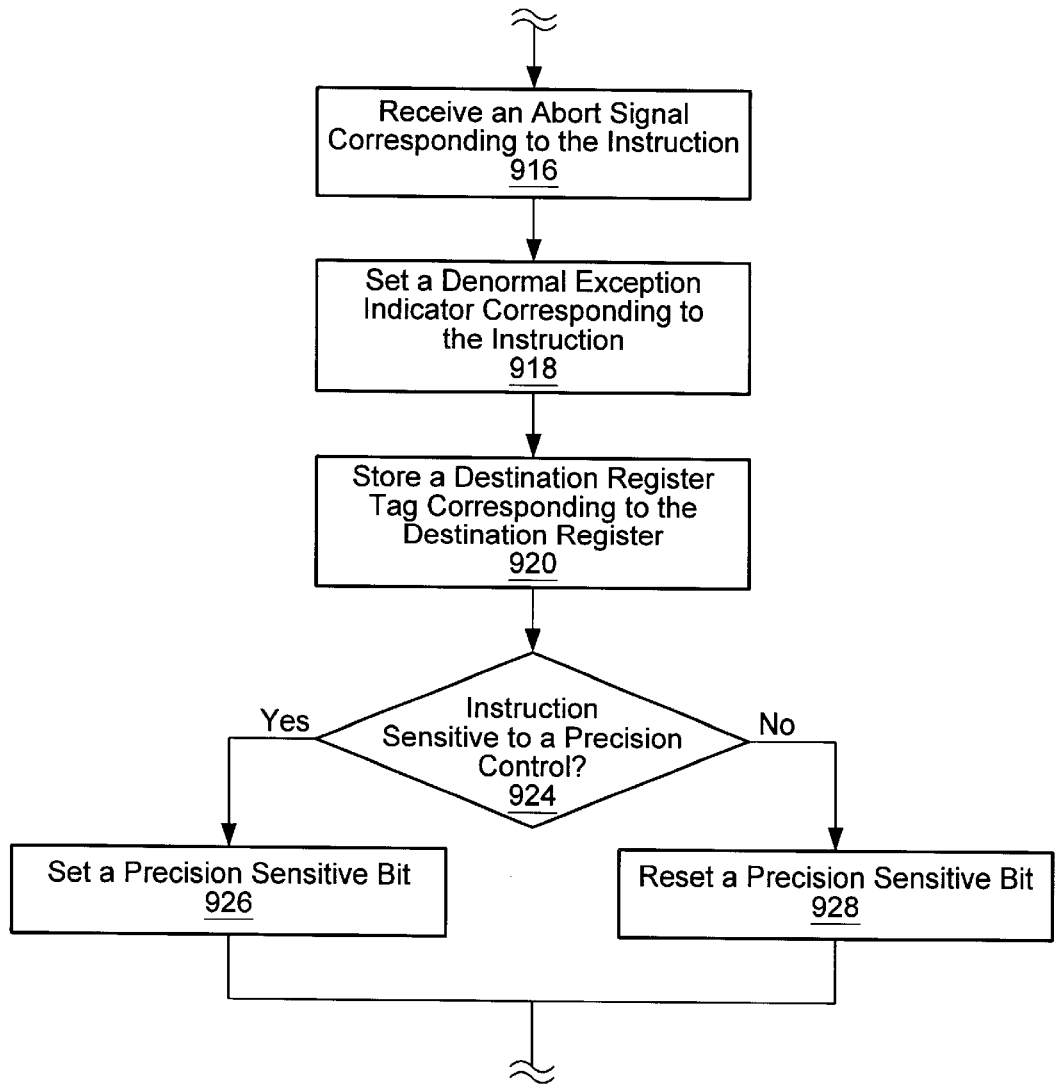
FIG. 9B is a second portion of a chart depicting a method for handling tiny numbers using a super sticky bit.
Figure 9C:
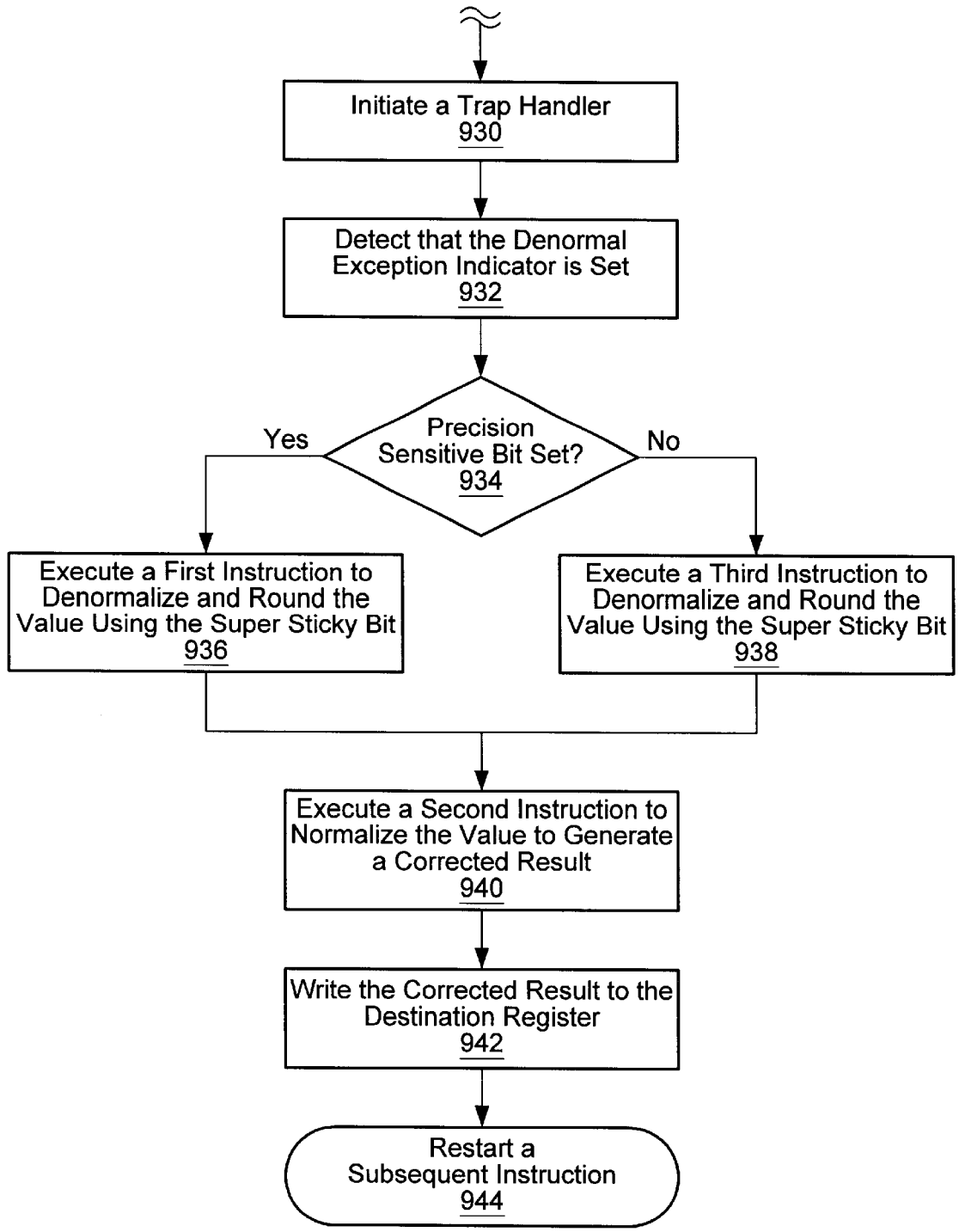
FIG. 9C is a third portion of a chart depicting a method for handling tiny numbers using a super sticky bit.

Turning now to FIGS. 9A, 9B, and 9C, a chart depicting a method for handling tiny numbers using a super sticky bit is shown. Variations on the method are possible and contemplated. Block 902 indicates determining that a preliminary result of an instruction corresponds to a tiny number. In one embodiment, the preliminary result can comprise the unrounded and normalized result of the instruction. In other embodiments, the preliminary result can comprise a rounded or unnormalized result of the instruction. Block 904 indicates generating a tiny number signal. The tiny number signal can correspond to the instruction. Block 906 indicates determining that the underflow exception is masked. As noted above, IEEE-754 requires the ability to set a mask corresponding to an underflow exception. Block 908 indicates generating a super sticky bit. In one embodiment, the super sticky bit can be generated based on the value of a sticky bit and a guard bit that correspond to a result of the instruction. In one particular embodiment, the super sticky bit can be generated by performing a logical OR function on the sticky bit and the guard bit.

Block 910 indicates writing a value corresponding to the preliminary result to a destination register. In one embodiment, the value can comprise the normalized, unrounded result of the instruction. Block 912 indicates writing the super sticky bit to the destination register. In one embodiment, the super sticky bit can be written to a bit adjacent to the least significant bit of the mantissa of the value written to the destination register. Other embodiments can be configured write the super stick bit to other locations.

Block 914 indicates generating a trap signal corresponding to the instruction. Block 918 indicates receiving an abort signal corresponding to the instruction. The abort signal can be configured to indicate that a trap signal has been generated that corresponds to the instruction. In one embodiment, the abort signal can be received in conjunction with the instruction being retired. Other embodiments can be configured to receive the abort signal at other times. In some embodiments, the instruction can be retired and younger instructions can be aborted. Block 918 indicates setting a denormal exception indicator corresponding to the instruction. In one embodiment, the denormal exception indicator indicates that a tiny number has been detected and the underflow exception is masked. Block 920 indicates storing a destination register tag corresponding to the destination register. In one embodiment, the destination register tag can comprise the absolute register number corresponding to the destination register. In other embodiments, the destination register tag can comprise a physical register number or other register identifier.

In block 924, a determination is made as to whether the instruction is sensitive to a precision control. In one embodiment, the precision control can comprise one or more bits that can be set to indicate the precision of the result of the instruction. Other embodiments can include other types of precision controls. Block 926 indicates setting a precision sensitive bit if the instruction is sensitive to the precision control. Block 928 indicates resetting a precision sensitive bit if the instruction is not sensitive to a precision control. As noted above, certain instructions return a result based on a value of the precision control. These instructions can be said to be sensitive to the precision control. Other instructions that return a result irrespective of the precision control can be said to not be sensitive to the precision control.

Block 930 indicates initiating a trap handler. In one embodiment, the trap handler can be initiated in response to receiving the abort signal. Other embodiments can initiate the trap handler in response to other signals. Block 932 indicates detecting that the denormal exception indicator has been set. In one embodiment, the denormal exception indicator, when set, indicates that a tiny number has been detected and the underflow exception is masked. Other embodiments can be configured to assign other values to the denormal exception indicator. The trap handler can be configured to denormalize, round, and renormalize the value stored in the destination register using the super sticky bit to generate a corrected result for the instruction in response to the denormal exception indicator being set as indicated by blocks 936, 938, and 940. The trap handler can then write the corrected result back to the destination register as indicated by block 942. Block 944 indicates restarting a subsequent instruction.

In one embodiment, a determination can be made as to whether the precision sensitive bit has been set as indicated by block 934. Block 936 indicates executing a first trap instruction to denormalize and round the value using the super sticky bit if the precision sensitive bit has been set. Block 940 indicates executing a second trap instruction to normalize the value to generate a corrected result. Block 938 indicates executing a third trap instruction to denormalize and round the value using the super sticky bit if the precision sensitive bit has not been set. Other embodiments can be configured to execute other numbers of instructions to denormalize, round, and renormalize the value.

Figure 10:
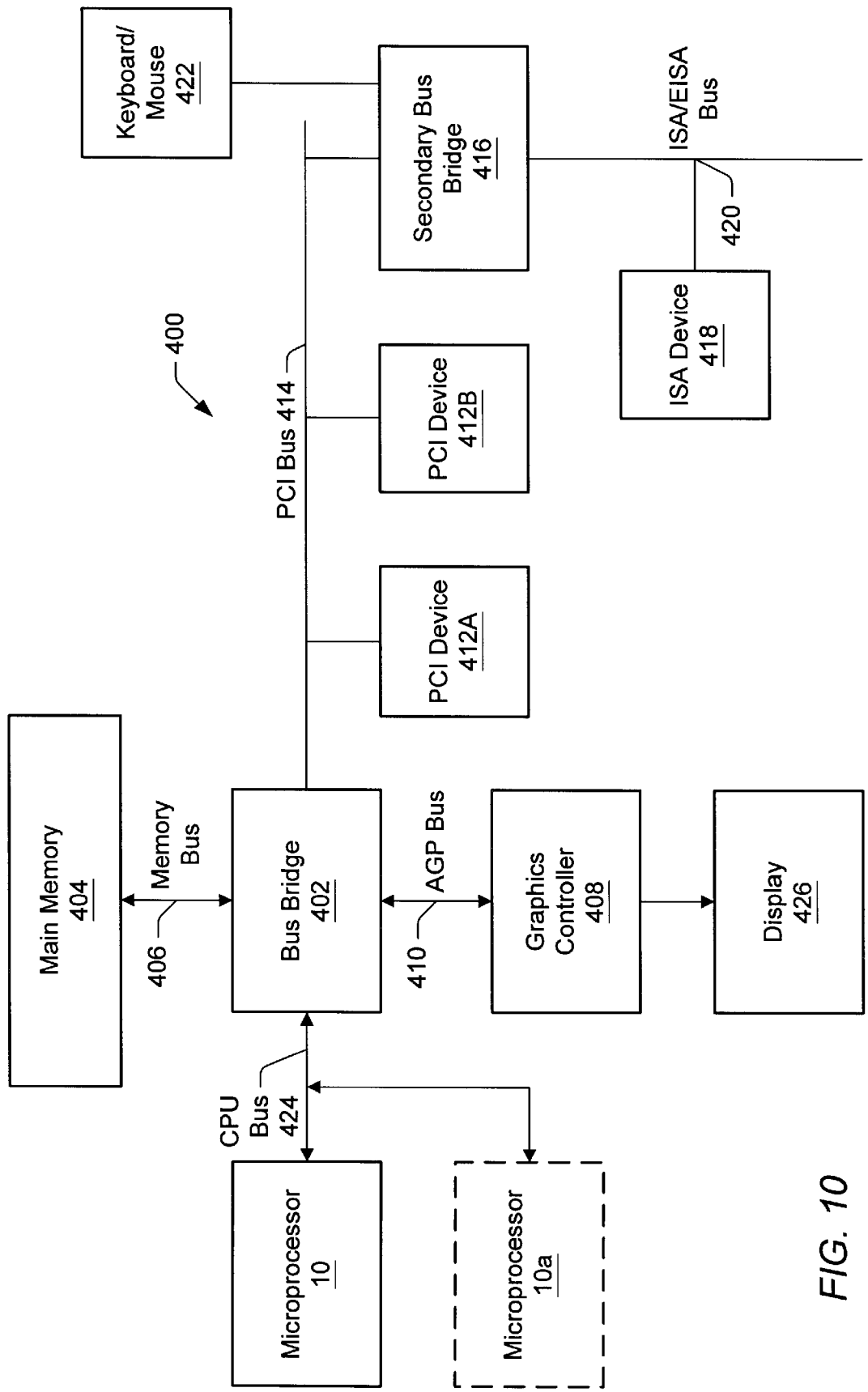
FIG. 10 is a block diagram of one embodiment of a computer system configured to utilize the microprocessor of FIG. 1.

Turning now to FIG. 10, a block diagram of one embodiment of a computer system 400 including microprocessor 10 is shown. Microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g. microprocessor 10a shown as an optional component of computer system 400). Microprocessor 10a may be similar to microprocessor 10. More particularly, microprocessor 10a may be an identical copy of microprocessor 10. Microprocessor 10a may share CPU bus 424 with microprocessor 10 or may be connected to bus bridge 402 via an independent bus.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

We claim:

1. An execution unit comprising:
    an execution pipeline, wherein said execution pipeline is configured to generate a super sticky bit corresponding an instruction in response to a preliminary result of said instruction corresponding to a tiny number and an underflow exception mask being asserted, and wherein said execution pipeline is configured to store a value corresponding to said preliminary result and said super sticky bit in a destination register;
    a retire queue coupled to said execution pipeline, wherein said retire queue is configured to set a denormal exception indicator in response to said preliminary result of said instruction corresponding to a tiny number and said underflow exception mask being set, and wherein said retire queue is configured to store a destination register tag corresponding to said destination register; and
    a trap handler, wherein said trap handler is configured to generate a corrected result using said value and said super sticky bit in response to said denormal exception indicator being set, and wherein said trap handler is configured to store said corrected result in said destination register using said destination register tag.

2. The execution unit of claim 1, wherein said execution pipeline is configured to generate a sticky bit and a guard bit corresponding to said preliminary result, and wherein said execution pipeline is configured to generate said super sticky bit based on said sticky bit and said guard bit.

3. The execution unit of claim 1, wherein said retire queue includes a reason code register, wherein said reason code register includes said denormal exception indicator and said destination register tag.

4. The execution unit of claim 1, wherein said trap handler is configured to denormalize, round, and normalize said value to generate said corrected result.

5. The execution unit of claim 1, wherein said retire queue is configured to set a precision sensitive bit in response to said instruction being sensitive to a precision control bit, wherein said trap handler is configured to cause a first trap instruction to denormalize and round said value in response to said precision sensitive bit being set, and wherein said trap handler is configured to cause a second trap instruction to normalize said value.

6. The execution unit of claim 5, wherein said retire queue is configured to reset a precision sensitive bit in response to said instruction not being sensitive to a precision control bit, and wherein said trap handler is configured to cause a third trap instruction to denormalize and round said value in response to said precision sensitive bit being reset.

7. The execution unit of claim 1, further comprising:
    a control unit coupled to said execution pipeline, wherein said control unit is configured to generate a trap signal corresponding to said instruction;
    wherein said retire queue is configured to receive an abort signal corresponding to said trap signal, wherein said retire queue is configured to generate a denormal exception signal in response to said abort signal, and wherein said retire queue is configured to store said denormal exception signal in said denormal exception indicator.

8. A method comprising:
    determining that a preliminary result of an instruction corresponds to a tiny number;
    determining that an underflow exception is masked;
    generating a super sticky bit;
    writing a value corresponding to said preliminary result to a destination register;
    initiating a trap handler;
    generating a corrected result using said value and said super sticky bit; and
    writing said corrected result to said destination register.

9. The method of claim 8, further comprising:
    generating said super sticky bit based on a sticky bit and a guard bit corresponding to said preliminary result.

10. The method of claim 8, further comprising:
    setting a denormal exception indicator corresponding to said instruction;
    wherein said initiating includes detecting that said denormal exception indicator has been set.

11. The method claim 8, wherein said generating said corrected result includes denormalizing, rounding, and renormalizing said value.

12. The method of claim 8, further comprising:
    determining whether said instruction is sensitive to a precision control;
    setting a precision sensitive bit in response to said instruction being sensitive to said precision control;
    executing a first trap instruction to denormalize and round said value in response to said precision sensitive bit being set; and executing a second trap instruction to normalize said value.

13. The method of claim 12, further comprising:

resetting said precision sensitive bit in response to said instruction not being sensitive to said precision control; and executing a third trap instruction to denormalize and round said value in response to said precision sensitive bit being set.

14. A microprocessor comprising:

an execution unit, wherein said execution unit includes:
   an execution pipeline, wherein said execution pipeline is configured to generate a super sticky bit corresponding to an instruction in response to a preliminary result of said instruction corresponding to a tiny number and an underflow exception mask being asserted, and wherein said execution pipeline is configured to store a value corresponding to said preliminary result and said super sticky bit in a destination register;
   a retire queue coupled to said execution pipeline, wherein said retire queue is configured to store a denormal exception indicator corresponding to said instruction, and wherein said retire queue is configured to store a destination register tag corresponding to said destination register; and
   a trap handler, wherein said trap handler is configured to generate a corrected result using said value and said super sticky bit in response to said denormal exception indicator being set, and wherein said trap handler is configured to store said corrected result in said destination register using said destination register tag; and
a reorder buffer coupled to said execution pipeline, wherein said reorder buffer is configured to convey an abort signal corresponding to said instruction to said retire queue.

15. The microprocessor of claim 14, wherein said execution pipeline is configured to generate a sticky bit and a guard bit corresponding to said preliminary result, and wherein said execution pipeline is configured to generate said super sticky bit based on said sticky bit and said guard bit.

16. The microprocessor of claim 14, wherein said retire queue includes a reason code register, wherein said reason code register includes said denormal exception indicator and said destination register tag.

17. The microprocessor of claim 14, wherein said trap handler is configured to denormalize, round, and normalize said value to generate said corrected result.

18. The microprocessor of claim 14, wherein said retire queue is configured to set a precision sensitive bit in response to said instruction being sensitive to a precision control bit, wherein said trap handler is configured to cause a first trap instruction to denormalize and round said value in response to said precision sensitive bit being set, and wherein said trap handler is configured to cause a second trap instruction to normalize said value.

19. The microprocessor of claim 18, wherein said retire queue is configured to reset a precision sensitive bit in response to said instruction not being sensitive to a precision control bit, and wherein said trap handler is configured to cause a third trap instruction to denormalize and round said value in response to said precision sensitive bit being reset.

20. The microprocessor of claim 14, wherein said execution unit includes a control unit coupled to said execution pipeline, wherein said control unit is configured to generate a trap signal corresponding to said instruction, wherein said control unit is configured to convey said trap signal to said reorder buffer, wherein said retire queue is configured to receive said abort signal corresponding to said trap signal, wherein said retire queue is configured to generate a denormal exception signal in response to said abort signal, and wherein said retire queue is configured to store said denormal exception signal in said denormal exception indicator.

21. A computer system comprising:

a microprocessor including:
   an execution unit, wherein said execution unit includes:
      an execution pipeline, wherein said execution pipeline is configured to generate a super sticky bit corresponding an instruction in response to a preliminary result of said instruction corresponding to a tiny number and an underflow exception mask being asserted, and wherein said execution pipeline is configured to store a value corresponding to said preliminary result and said super sticky bit in a destination register;
      a retire queue coupled to said execution pipeline, wherein said retire queue is configured to store a denormal exception indicator corresponding to said instruction, and wherein said retire queue is configured to store a destination register tag corresponding to said destination register; and
      a trap handler, wherein said trap handler is configured to generate a corrected result using said value and said super sticky bit in response to said denormal exception indicator being set, and wherein said trap handler is configured to store said corrected result in said destination register using said destination register tag; and
   a reorder buffer coupled to said execution pipeline, wherein said reorder buffer is configured to convey an abort signal corresponding to said instruction to said retire queue; and
an input/output (I/O) device coupled to said microprocessor and to another computer system, wherein said I/O device is configured to communicate between said microprocessor and said another computer system.

22. The computer system as recited in claim 21, wherein said I/O device comprises a modem.

* * * * *

UNITED STATES PATENT AND TRADEMARK OFFICE
CERTIFICATE OF CORRECTION

PATENT NO. : 6,374,345 B1
DATED : April 16, 2002
INVENTOR(S) : Norbert Juffa and Stuart E. Oberman It is certified that error appears in the above-identified patent and that said Letters Patent is hereby corrected as shown below:

Column 23,
Line 57, please insert -- of -- after "method".

Signed and Sealed this

Twenty-fifth Day of June, 2002

*Attest:*

*Attesting Officer*

JAMES E. ROGAN
*Director of the United States Patent and Trademark Office*